Patented May 19, 1953

2,639,282

UNITED STATES PATENT OFFICE 2,639,282

RESIN-DYES OF THE CYANINE TYPE

Robert H. Sprague, Leslie G. S. Brooker, and Samuel G. Dent, Jr., Rochester, N. Y., assignors to Eastman Kodak Company, Rochester, N. Y., a corporation of New Jersey No Drawing. Application September 29, 1949, Serial No. 118,702

8 Claims. (Cl. 260—240)

This invention relates to resin-dyes of the cyanine type.

A large number of cyanine dyes are known, and such dyes have been widely used to sensitize photographic emulsions and in the preparation of filter layers. However, certain of these dyes are subject to the disability that when incorporated in a gelatin layer, they are prone to wander from this layer into a different layer where their presence is not desired. Methods have heretofore been proposed for rendering certain of these cyanine dyes non-diffusible or retarding such diffusion, however some of the methods have been somewhat short of a satisfactory solution to the problem.

We have now found a new method for retarding the diffusion of dyes of the cyanine type from gelatin layers in which they have been incorporated.

It is, therefore, an object of our invention to provide new resin-dyes of the cyanine type. A further object is to provide a method for preparing such dyes. A still further object is to provide photographic silver-halide emulsions, filter layers comprising such dyes, and a method for preparing such emulsions and filter layers. Other objects will become apparent from a consideration of the following description and examples.

According to our invention, we prepare new resin-dyes of the cyanine type by reacting a dye of the cyanine type which contains a hydroxyalkyl attached to one of the auxochromophoric nitrogen atoms of said dye with a vinylene polymer containing carboxylic halide and/or anhydride groups.

Vinylene polymers containing carboxylic halide (e. g. chloride, bromide, etc.) and/or anhydride groups include the interpolymers of maleic anhydride, e. g. interpolymers of maleic anhydride with styrene, vinyl acetate, vinyl chloride, alkyl vinyl ethers (e. g. ethyl vinyl ether, etc.), acrylic acid, α-methacrylic acid, etc., as well as the corresponding interpolymers of maleyl and fumaryl halides (e. g. chlorides, bromides, etc.) with these compounds; polyacrylyl halides, e. g. polyacrylyl chloride, poly α-methacrylyl chloride, etc.; polyacrylic anhydrides, e. g. polyacrylic anhydride, poly α-methacrylic anhydride, etc.; etc. Useful interpolymers of maleic anhydride, substituted maleic anhydrides (e. g. citraconic anhydride, phenylmaleic anhydride, etc.), fumaryl halides; maleyl halides with vinyl compounds, which can be employed in practicing our invention, are described in Voss and Fikentscher U. S. Patent 2,047,398, dated July 14, 1936. Useful polymers of acrylic halides (i. e. acrylic and α-methacrylic halides), which can be used in practicing our invention, are described in Mark and Fikentscher U. S. Patent 1,984,417, dated December 18, 1934. Such polymers include polyacrylyl chloride, poly α-methacrylyl chloride, etc. as well as copolymers of these halides with a vinyl compound, such as vinyl acetate, styrene, ethyl acrylate, acrylonitrile, etc.

As dyes of the cyanine type, the dyes selected from those represented by the following general formulas can be used:

I. 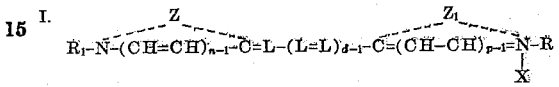

II. 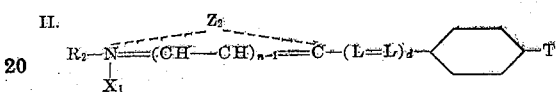

and

II. 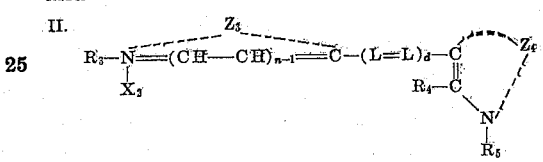

wherein $d$, $n$ and $p$ each represents a positive integer from 1 to 2, X, $X_1$ and $X_2$ each represents an acid radical, e. g. chloride, bromide, iodide, perchlorate, acetate, ethylsulfate, thiocyanate, p-toluenesulfonate, benzenesulfonate, sulfamate, etc.; R and $R_3$ each represents an alkyl group, e. g. methyl, ethyl, n-propyl, n-butyl, allyl, β-hydroxyethyl, γ-hydroxypropyl, β-methoxyethyl, β-ethoxyethyl, β-acetoxyethyl, benzyl, etc. groups; $R_1$, $R_2$ and $R_5$ each represents a hydroxyalkyl group, e. g. β-hydroxyethyl, γ-hydroxypropyl, β-hydroxypropl, β-hydroxyisopropyl, etc.; $R_4$ represents a hydrogen atom or an alkyl group, e. g. methyl, ethyl, etc.; L represents a methenyl group (unsubstituted and substituted, e. g. by a methyl ethyl, n-propyl, benzyl, or phenyl group); T represents a hydroxyl group or a dialkylamino (e. g. dimethylamino diethylamino, ethylmethylamino, etc.) group; $Z_4$ represents the non-metallic atoms necessary to complete a heterocyclic nucleus of the pyrrole series; and Z, $Z_1$, $Z_2$ and $Z_3$ each represents the non-metallic atoms necessary to complete a heterocyclic nucleus of the oxazole series (e. g. methyl, 4-phenyloxazole, 4-ethyloxazole, 4,5-diphenyloxazole, 5-phenyloxazole), the benzoxazole series (e. g. benzoxazole, 5-chlorobenzoxazole, 5-phenylbenzoxazole, 5-methylbenzoxazole, 5-hydroxybenzoxazole, 5-methoxybenzoxazole, etc.), the naphthoxazole series (e. g. α-naphthoxazole, β-naphthoxazole, etc.), the thiazole series (e. g. thiazole, 4-methylthiazole, 4-phenylthiazole, 4,5-diphenylthiazole, 5-phenylthiazole, 4,5-dimethylthiazole, 4-(2-thienyl)-thiazole, etc.), the benzothiazole series (e. g., benzothiazole, 4-phenylbenzothiazole, 5-phenylbenzothiazole, 4-methylbenzothiazole, 5-methylbenzothiazole, 5-methoxybenzothiazole, 5-ethoxybenzothiazole, 6-methylbenzothiazole, 6-methoxybenzothiazole, 6-ethoxybenzothiazole, 5-chlorobenzothiazole, 6-chlorobenzothiazole, 5,6-dimethoxybenzothiazole, 5,6-dioxymethylenebenzothiazole, tetrahydrobenzothiazole, 5-bromobenzothiazole, 5-iodobenzothiazole, 4-ethoxybenzothiazole, etc.), the naphthothiazole series (e. g. α-naphthothiazole, β-naphthothiazole, etc.), the selenazole series (4-methylselenazole, 4-phenylselenazole, etc.), the benzoselenazole series (benzoselenazole, 5-chlorobenzoselenazole, tetrahydrobenzoselenazole, etc.), the thiazoline series (e. g. thiazoline), the 3,3-dialkylindolenine series (e. g. 3,3-dimethylindolenine, 3,3,5-trimethylindolenine, 3,3,7-trimethylindolenine, etc.), the quinoline series (e. g., quinoline, 6-methylquinoline, 7-methylquinoline, 8-methylquinoline, 6-chloroquinoline, 8-chloroquinoline, 4-chloroquinoline, 5-ethoxyquinoline, 6-ethoxyquinoline, 7-ethoxyquinoline, 6-methoxyquinoline, etc.), the pyridine series (e. g. pyridine, 5-methylpyridine, etc.), etc.

Dyes selected from those represented by Formula I above can be prepared according to the methods described in Brooker et al. U. S. Patent 2,213,238, dated September 3, 1940, which gives details for a number of the dyes represented by Formula I. The dyes selected from those represented by Formula II above can be prepared by methods described in Brooker et al. U. S. Patent 2,231,658, dated February 11, 1941, as well as by methods hereinafter set forth. The dyes selected from those represented by Formula III above can advantageously be prepared by the method hereinafter set forth. In addition to the dyes represented by Formula II above, similar dyes which can be used include those described in Muller et al. U. S. Patent 2,280,253, dated April 21, 1942, for example, dyes represented by the following formulas:

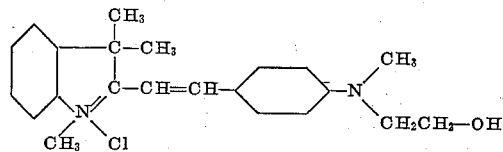

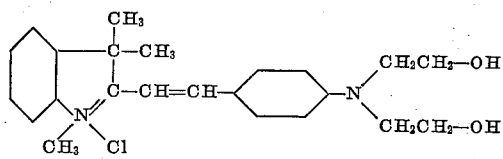

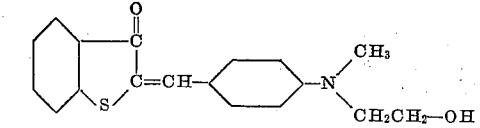

The following examples illustrate representative methods for preparing some of the dyes of the cyanine type, which can be converted to resin-dyes according to our invention.

*Example A.—3-ethyl-1'-β-hydroxyethyl-2',5'-dimethyloxa-3'-pyrrolocarbocyanine iodide*

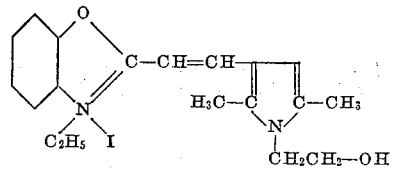

43.4 g. of 2-β-acetanilidovinylbenzoxazole ethiodide and 28 g. of 1-β-hydroxyethyl-2,5-dimethylpyrrole were heated together in 250 cc. of acetic anhydride solution at the refluxing temperature for 45 minutes. After chilling, the solid was collected on a filter, washed with acetone and then water. The yield of dye was 66% crude and 58% after one recrystallization from methyl alcohol. The orange plates had a melting point of 238°–240° C. with decomposition.

*Example B.—2-p-hydroxystyrylquinoline β-hydroxyethobromide*

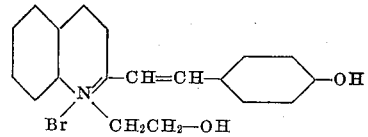

A few drops of piperidine was added, with stirring, to the fused mixture of 4.5 g. of quinaldine β-hydroxyethobromide and 3.0 g. of p-hydroxybenzaldehyde, and the whole was warmed over a free flame for 3 minutes. The solid was dissolved in methyl alcohol. The yield of once recrystallized dye was 78%. The reddish-orange needles had a melting point of 259°–260° C. with decomposition.

2-p-dimethylaminostyrylquinoline β-hydroxyethobromide represented by the formula:

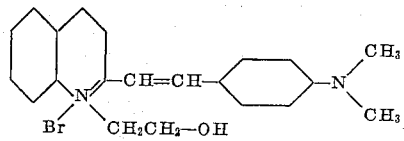

was obtained by replacing the p-hydroxybenzaldehyde in the above example by a molecularly equivalent amount of p-dimethylaminobenzaldehyde.

In like manner, by replacing the quinaldine β-hydroxyethobromide by a molecularly equivalent amount of 2-methylbenzothiazole β-hydroxyethobromide and the p-hydroxybenzaldehyde by a molecularly equivalent amount of p-dimethylaminobenzaldehyde in the above example, 2-p-dimethylaminostyrylbenzothiazole β-hydroxyethobromide represented by the following formula:

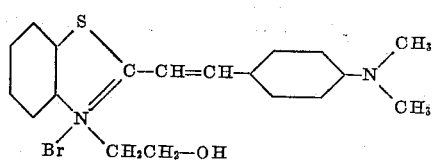

was obtained.

Where a vinylene polymer containing carboxylic anhydride groups is condensed with one of the cyanine dyes selected from those represented by the above general formulas, the condensation can advantageously be carried out in the presence of a few drops of a strong acid, which catalyzes the opening of the carboxylic anhydride rings. Useful acids include sulfuric, phosphoric, benzenesulfonic, p-toluenesulfonic, ethanesulfonic, ethanedisulfonic, etc. acids, although other acids can be used to advantage.

Condensation of vinylene polymers containing carboxylic halide and/or anhydride groups with one of the cyanine dyes selected from those represented by the above general formulas can alternatively be catalyzed by a tertiary amine. Useful tertiary amines include the trialkylamines (e. g. triethylamine, tri-n-butylamine, etc.), N,N-dialkylanilines (e. g. N,N-dimethylaniline, N,N - diethylaniline, etc.), N - alkylpiperidines (e. g. N-methylpiperidine, N-ethylpiperidine, etc.), pyridine, quinoline, isoquinoline, etc. These tertiary amines also provide a convenient reaction medium in which the condensations can be carried out. Inert solvents, e. g. aliphatic and aromatic hydrocarbons (e. g. n-hexane, n-heptane, benzene, toluene, the xylenes, etc.), halogenated hydrocarbons (e. g. chloroform, ethylene dichloride, etc.), high boiling ethers (e. g. 1,4-dioxane, n-amyl ether, etc.), ketones (e. g. acetone, n-butyl methyl ketone, n-butyl ethyl ketone, etc.), phenols (e. g. phenol, o- and p-cresols, etc.), etc. can be employed to advantage.

Heat accelerates the condensations and temperatures varying from 40° C. to the reflux temperature of the reaction mixture have been found to be most effective. The reaction can be carried out under superatmospheric pressures where higher temperatures are desired, e. g. where solvent or tertiary amine tends to boil off at the desired reaction temperature. The ratio of cyanine-type dye to vinylene polymer containing carboxylic halide and/or anhydride groups will, of course, vary, depending on temperature, presence or absence of solvent, strong acid or tertiary amine present, etc.

The following examples will serve to illustrate more fully the manner whereby we practice our invention.

*Example 1*

11 g. (1 mol.) of 3-ethyl-1'-β-hydroxyethyl-2',5'-dimethyloxa-3'-pyrrolocarbocyanine iodide represented by the following formula:

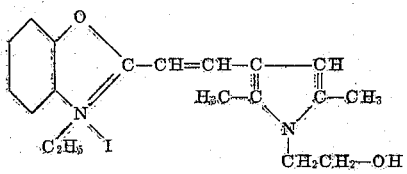

4.5 g. (1 mol. plus 100% excess) of polyacrylyl chloride and 200 cc. of dry chloroform were heated together to the boiling point. There were then added 10 cc. of dry pyridine, and the mixture was boiled under reflux for 24 hours. The chloroform was distilled off, 200 cc. of water added and the mixture distilled until 50 cc. of the water had been removed. The mixture was cooled to room temperature, the water decanted off from the rubbery brown product and the latter extracted with 30 cc. of hot methyl alcohol. The residue was discarded and the alcohol extract was concentrated to dryness, 11.3 g. of noncrystalline brown solid, representing a 92% yield, were obtained. The product was then dissolved in 200 cc. of methyl alcohol for testing as a filter dye.

*Example 2*

1.5 g. of 1'-ethyl-3-β-hydroxyethyl-6'-methoxythia-2'-cyanine bromide (melting at 260°–261° C. with decomposition) represented by the following formula:

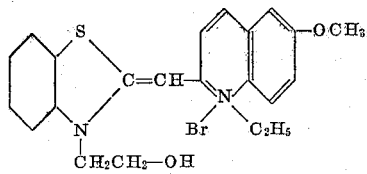

0.6 g. of a maleic anhydride-vinyl acetate interpolymer (1:1 mol. ratio), 20 cc. of chloroform and 7 drops of sulfuric acid were heated together at the refluxing temperature for one hour with occasional shaking. After chilling, the dye was collected on a filter. It was dissolved in 25 cc. of cresol, and this solution was added to 300 cc. of methyl alcohol, from which the dye was precipitated by the addition of 300 cc. of ether. The dye was collected on a filter as an orange plastic-like mass, weighing 1.1 g. It sensitized a photographic gelatino-silver bromoiodide emulsion to about 570 mμ with maximum sensitivity at about 540 mμ.

A resin-dye exhibiting similar sensitizing action can be obtained by replacing the maleic anhydride-vinyl acetate interpolymer used in the above example by a molecularly equivalent amount of polymethacrylic anhydride.

*Example 3*

1.0 g. of 1'-n-butyl-3-β-hydroxyethylthia-4'-carbocyanine iodide (melting at 272°–273° C. with decomposition) represented by the following formula:

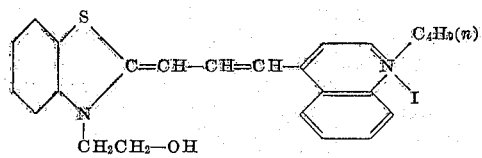

and 1.0 g. of a maleic anhydride-vinyl acetate interpolymer (1:1 mol. ratio) were dissolved in 10 cc. of cresol at 100° C., after adding 8 drops of sulfuric acid, the reaction mixture was heated for 2 minutes at about 100° C. with stirring. The cool reaction mixture was diluted to about 40 cc. with acetone and ether. After centrifuging the mixture, the liquors were decanted and the residue stirred with about 20 cc. of hot methyl alcohol. The mixture was cooled, again diluted to about 40 cc. with acetone and ether, and centrifuged. The plastic-like mass was given a further washing with acetone, the residue weighing 1.3 g. after drying. This dye sensitized a photographic gelatino-silver bromoiodide emulsion from about 580 to 690 mμ with maxima sensitivity at about 665 mμ and about 585 mμ.

By replacing the 1'-n-butyl-3-β-hydroxyethylthia-4'-carbocyanine iodide of the above example with a molecularly equivalent amount of 1″ - ethyl - 1′- γ -hydroxypropyl-2,2'-cyanine iodide represented by the following formula:

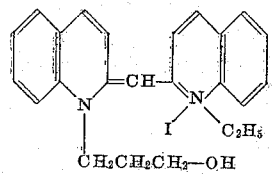

a resin-dye can be obtained which sensitizes about that portion of the spectrum wherein the unreacted dye exhibits its sensitizing action.

Similarly, by replacing the 1'-n-butyl-3-β-hydroxyethylthia-4'-carbocyanine iodide with a molecularly equivalent of 3-ethyl-3'-β-hydroxyethyloxathiacarbocyanine iodide represented by the following formula:

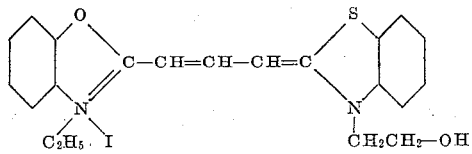

a resin dye exhibiting sensitizing action can be obtained.

Example 4

1.4 g. of 2-p-hydroxystyrylquinoline β-hydroxyethobromide represented by the following formula:

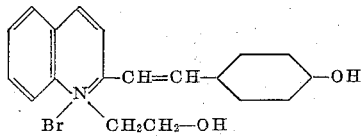

and 1.0 g. of a maleic anhydride-vinyl acetate interpolymer (1:1 mol. ratio) were dissolved in 10 cc. of cresol at 100° C., and after adding 8 drops of sulfuric acid, the reaction mixture was heated for about 2 minutes at about 100° C. The yellow solution was cooled, acetone added, and the dye precipitated by cautiously adding ether. The mixture was centrifuged, the liquors decanted and the residue then stirred with acetone. After centrifuging, the acetone washings were decanted. The dye was then washed with water, ether and again with acetone.

By replacing the maleic anhydride-vinyl acetate interpolymer with a like amount of a maleic anhydride-styrene interpolymer (1:1 mol. ratio) in the above example, a resin-dye can also be obtained.

Example 5

1.0 g. of 2-p-dimethylaminostyrylquinoline β-hydroxyethobromide represented by the following formula:

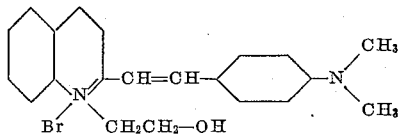

and 0.46 g. of a maleic anhydride-vinyl acetate interpolymer (1:1 mol. ratio) were ground together and then heated in 20 cc. of chloroform containing 10 drops of sulfuric acid at the refluxing temperature for about 30 minutes. After chilling, the dye was collected on a filter. It was placed in a beaker, acetone added and the mixture stirred. The acetone washings were decanted, and the dye residue dissolved in methyl alcohol, then precipitated by adding ether. When the mixture was filtered, the dye remained as a sticky residue on the filter paper.

Example 6

1.0 g. of 2-p-dimethylaminostyrylbenzothiazole β-hydroxyethobromide represented by the following formula:

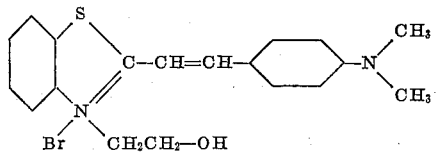

and 0.45 g. of a maleic anhydride-vinyl acetate interpolymer were ground together and then heated in 20 cc. of chloroform containing 10 drops of sulfuric acid at the refluxing temperature for about 30 minutes. After chilling, the dye was collected on a filter, stirred in a beaker with acetone and the acetone washings decanted. The residue was dissolved in methyl alcohol, and the dye precipitated by adding ether. After drying, 1.1 g. of product were obtained.

By replacing the 2-p-dimethylaminostyrylbenzothiazole β-hydroxyethobromide used in the above example with a molecularly equivalent amount of 3-ethyl-3'-β-hydroxyethylthiaselenacarbocyanine bromide represented by the following formula:

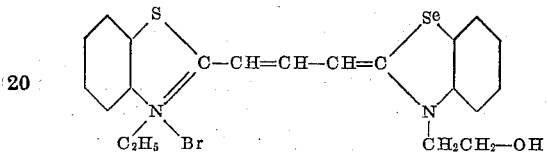

a plastic-like resin-dye can be obtained.

By replacing the cyanine type dyes containing hydroxyalkyl groups and vinylene polymers containing carboxylic halide and/or anhydride groups used above with other representative substances selected from those set forth above, other resin-dyes exhibiting sensitizing action or light-filtering properties can be obtained, using the procedure set forth in detail in the above illustrative examples. It can be readily seen that our new resin-dyes can be prepared by a single condensation involving a combination of a dye of the cyanine type containing a hydroxyalkyl group with a vinylene polymer containing carboxylic halide and/or anhydride groups. Variations in combinations can expeditiously be made by varying the reactants according to directions hereinbefore set forth.

While our invention has been described with particular reference to monomethine, carbocyanine and styryl dyes containing a hydroxyalkyl group, other dyes containing a hydroxyalkyl group which can also be employed in practicing our invention include merocyanine, oxonol and hemioxonol dyes. The hydroxyalkyl group can be attached to the heterocyclic nucleus through a linkage other than the N—C bond illustrated, e. g. to a carbon atom of the nucleus through an intermediate sulfur or oxygen linkage thus C—S—C (hydroxyalkylmercapto) or C—O—C (hydroxyalkoxy). Groups other than hydroxyalkyl groups, which react with carboxylic halide or anhydride groups, can be utilized in place of the hydroxyalkyl groups illustrated to give new resin dyes. Such groups include, for example, amino, N-monoalkylamino, hydroxyl, etc. groups. The following examples illustrate this useful alternative.

Example 7

3.46 g. of 3-amino-4-[(3-ethyl-2(3)-benzoxazolylidene)-ethylidene]-1-phenyl-5-pyrazolone represented by the following formula:

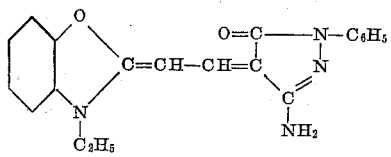

and 1.84 g. of a maleic anhydride-vinyl acetate interpolymer (1:1 mol. ratio) were ground together, and then heated in 25 cc. of chloroform containing 10 drops of sulfuric acid at the refluxing temperature for 50 minutes. After cooling, the solid was collected on a filter and washed with methyl alcohol. The filter cake was then extracted with 125 cc. of hot methyl alcohol. When this extract was chilled, 1.1 g. of an orange amorphous solid separated. It sensitized a photographic gelatino - silver - chlorobromide emulsion to about 520 m$\mu$ with maximum sensitivity at about 485 m$\mu$.

The 3 - amino-4-[(3-ethyl-2(3)-benzoxazolylidene)ethylidene]-1-phenyl-5-pyrazolone used in the above example was obtained as follows:

1.0 g. (1 mol.) of triethylamine was added to a suspension of 4.34 g. (1 mol.) of 2-$\beta$-acetanilido-vinylbenzoxazole ethiodide and 1.75 g. (1 mol.) of 3-amino-1-phenyl-5-pyrazolone in 50 cc. of absolute ethyl alcohol, and the reaction mixture was heated at the refluxing temperature for 10 minutes. After chilling, the solid was collected on a filter and washed with methyl alcohol. The yield of dye was 84% crude and 64% after two recrystallizations from methyl alcohol. The reddish-orange crystals had a melting point of 206°–207° C. with decomposition.

Example 8

3.46 g. of 4-[(3-ethyl-2(3)-benzoxazolylidene)ethylidene]-3-hydroxy-1-phenyl - 5 - pyrazolone represented by the following formula:

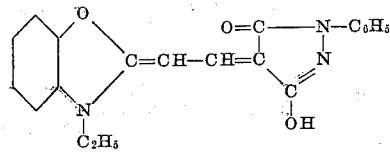

and 1.84 g. of a maleic anhydride-vinyl acetate interpolymer (1:1 mol. ratio) were ground together and then heated in 25 cc. of chloroform containing 10 drops of sulfuric acid. After cooling the mixture, the dye was collected on a filter and washed with methyl alcohol. It showed sensitization of a photographic gelatino-silver-chlorobromide emulsion to about 520 m$\mu$ with maximum sensitivity at about 480 m$\mu$.

The 4- [(3 - ethyl - 2(3) - benzoxazolylidene)ethylidene] - 3 - hydroxy-1-phenyl-5-pyrazolone used in the above example was obtained as follows:

1.0 g. (1 mol.) of triethylamine was added to a suspension of 4.34 g. (1 mol.) of 2-$\beta$-acetanilido-vinylbenzoxazole ethiodide and 1.76 g. (1 mol.) of 3-hydroxy-1-phenyl-5-pyrazolone in 50 cc. of absolute ethyl alcohol, and the reaction mixture was heated at the refluxing temperature for 10 minutes. After chilling, the solid was collected on a filter and washed with methyl alcohol. The yield of dye was 95% crude and 52% after two recrystallizations from methyl alcohol. The yellow crystals had a melting point of 313–318° C. with decomposition.

Where the resin-dyes of our invention have been obtained from a vinylene polymer containing carboxylic halide groups, the products are generally heated for a short period in the presence of water to hydrolyze unreacted halide groups to carboxylic groups. This procedure is followed in Example 1 above.

In the preparation of photographic silver halide emulsions containing those of our new resin-dyes which exhibit sensitizing action, it is only necessary to disperse the dyes in the emulsions. Ordinarily this is advantageously accomplished by dissolving the dyes in methanol or ethanol, or a mixture of the two, and dispersing the resulting solution in the emulsion. Some of the less soluble dyes can be converted to their salt forms and dissolved more readily, either in water, or the alcohols listed above, in this form. Quite unexpectedly, we have found that certain of the less soluble dyes of the cyanine type, when reacted with certain vinylene polymers containing carboxylic halide and/or anhydride according to our invention, can be dissolved or dispersed more readily than the unreacted dye in solvents, e. g. methanol or ethanol. The salts are advantageously formed by adding to the resin-dye, wet with a little water, methanol or ethanol, to an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N - methylpiperidine, n - propylamine, isopropylamine, butylamine, $\beta$-ethoxyethylamine, etc., and taking up the salt which forms in a suitable solvent, e. g. methanol, ethanol, a mixture of methanol and ethanol, etc.

Sensitization by means of our new resin-dyes is primarily directed to the ordinarily employed gelatino-silver-halide developing-out emulsions, e. g. gelatino-silver-chloride, -chlorobromide, -chlorobromiodide, -bromide and -bromiodide developing-out emulsions. The resin-dyes, or the salt forms of these dyes, are advantageously added to the finished emulsions and should, of course, be uniformly distributed throughout the emulsions.

The concentration of these compounds in the emulsion can vary widely, e. g. from about 5 to about 100 mg. per liter of flowable emulsion. The concentration of the dye will vary according to the type of light-sensitive material and according to the effects desired. The most suitable and most economical concentration for any given emulsion will be apparent to those skilled in the art, upon making the ordinary tests and observations customarily used in the art of emulsion making. To prepare a gelatino-silver-halide emulsion sensitized with one of our new resin-dyes, the following procedure is satisfactory: a quantity of the resin-dye, or the salt form of the dye, is dissolved in methanol, ethanol, or a mixture of methanol and ethanol, and a volume of the solution containing from 5 to 100 mg. of dye is slowly added to about 1000 cc. of a gelatino-silver-halide emulsion with stirring. Stirring is continued until the resin-dye, or the salt form of the resin-dye, is uniformly dispersed. With the more powerful of our new sensitizing dyes, 10 to 50 mg. of dye per 1000 cc. of emulsion suffice to produce the maximum sensitizing effect with the ordinary gelatino-silver-halide emulsions.

The above statements are only illustrative and are not to be understood as limiting our invention in any sense, as it will be apparent that our new resin-dyes or the salt forms of these dyes, can be incorporated by other methods in many of the photographic emulsions customarily employed in the art, such, for instance, as by bathing a plate or film upon which an emulsion is coated, in a solution of the dye (or its salt form) in an appropriate solvent, although such a method is ordinarily not to be preferred.

In the preparation of photographic silver halide emulsions containing our new resin-dyes (or the salt forms thereof) which can advantageously be used for the preparation of overcoating layers, filter layers, etc., the following procedure can be used: from 50 mg. to 150 mg. of the resin-dye, or the salt form of the dye, are dissolved in from 2 to 5 cc. of a water-miscible solvent. Methanol, or ethanol is suitable for this purpose, but other solvents can also be used. The solution is then added to about 25 cc. of a 5% gelatin solution at 40° C. and the mixture coated on the support.

What we claim as our invention and desire protected by Letters Patent of the United States is:

1. A resin-dye selected from those represented by the three following general formulas:

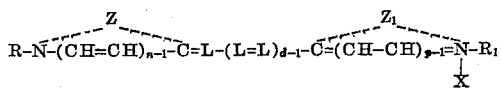

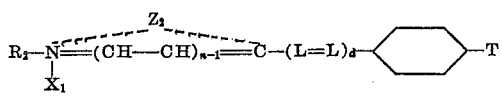

and

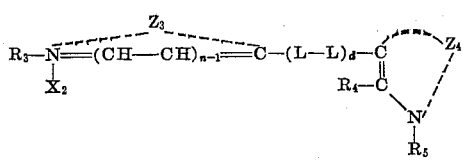

wherein $d$, $n$ and $p$ each represents a positive integer from 1 to 2, X, $X_1$ and $X_2$ each represents an acid radical, R and $R_3$ each represents a primary alkyl group containing from 1 to 4 carbon atoms, $R_1$, $R_2$ and $R_5$ each represents a hydroxyalkyl group containing from 2 to 3 carbon atoms, the hydroxyl group of said hydroxyalkyl groups having been esterified by a polymer of a monomer selected from the group consisting of an $\alpha,\beta$-ethylenically-unsaturated, aliphatic hydrocarbon carboxylic halide containing from 3 to 4 carbon atoms and an $\alpha,\beta$-ethylenically-unsaturated, aliphatic hydrocarbon carboxylic anhydride containing from 4 to 12 carbon atoms, $R_4$ represents a member selected from the group consisting of a hydrogen atom, a methyl group and an ethyl group, L represents a methenyl group, T represents a member selected from the group consisting of a hydroxyl group, a dimethylamino group and a diethylamino group, $Z_4$ represents the non-metallic atoms necessary to complete a heterocyclic nucleus of the pyrrole series, and Z, $Z_1$, $Z_2$ and $Z_3$ each represents the non-metallic atoms necessary to complete a heterocyclic nucleus selected from the group consisting of those of oxazole series, the benzoxazole series, the nathphoxazole series, the thiazole series, the benzothiazole series, the naththothiazole series, the selenazole series, the benzoselenazole series, the thiazoline series, the 3,3-dimethylindolenine series, the quinoline series and the pyridine series.

2. A resin-dye represented by the following general formula:

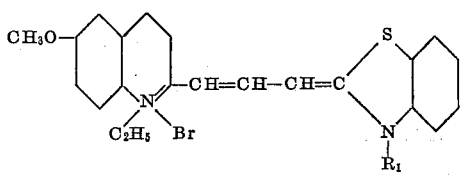

wherein $R_1$ represents a $\beta$-hydroxyethyl group, the hydroxyl group of which has been esterified by an interpolymer of maleic anhydride and vinyl acetate.

3. A resin-dye represented by the following general formula:

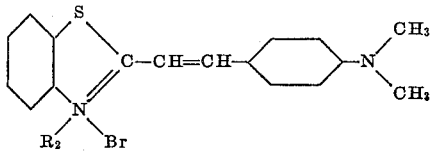

wherein $R_2$ represents a $\beta$-hydroxyethyl group, the hydroxyl group of which has been esterified by an interpolymer of maleic anhydride and vinyl acetate.

4. A resin-dye represented by the following formula:

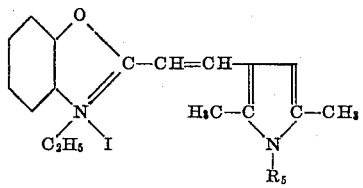

wherein $R_5$ represents a $\beta$-hydroxyethyl group, the hydroxyl group of which has been esterified by polyacrylyl chloride.

5. A process for preparing a resin-dye comprising reacting a dye selected from those represented by the three following general formulas:

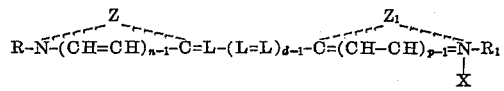

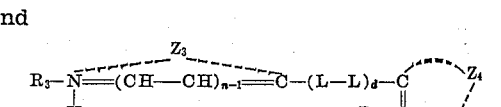

and

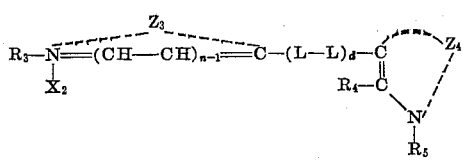

wherein $d$, $n$ and $p$ each represents a positive integer from 1 to 2, X, $X_1$ and $X_2$ each represents an acid radical, R and $R_3$ each represents a primary alkyl group containing from 1 to 4 carbon atoms, $R_1$, $R_2$ and $R_5$ each represents a hydroxyalkyl group containing from 2 to 3 carbon atoms, $R_4$ represents a member selected from the group consisting of a hydrogen atom, a methyl group and an ethyl group, L represents a methenyl group, T represents a member selected from the group consisting of a hydroxyl group, a dimethylamino group and a diethylamino group, $Z_4$ represents the non-metallic atoms necessary to complete a heterocyclic nucleus of the pyrrole series, and Z, $Z_1$, $Z_2$ and $Z_3$ each represents the non-metallic atoms necessary to complete a heterocyclic nucleus selected from the group consisting of those of oxazole series, the benzoxazole series, the naphthoxazole series, the thiazole series, the benzothiazole series, the naphthothiazole series, the selenazole series, the benzoselenazole series, the thiazoline series, the 3,3-dimethylindolenine series, the quinoline series and the pyridine series, with a polymer of a monomer selected from the group consisting of an $\alpha,\beta$-ethylenically-unsaturated, aliphatic hydrocarbon carboxylic halide containing from 3 to 4 carbon atoms and an $\alpha,\beta$-ethylenically-unsaturated, aliphatic hydrocarbon carboxylic anhydride containing from 4 to 12 carbon atoms.

6. A process for preparing a resin-dye comprising reacting 1'-ethyl-3-β-hydroxyethyl-6'-methoxythia-2'-cyanine bromide represented by the following formula:

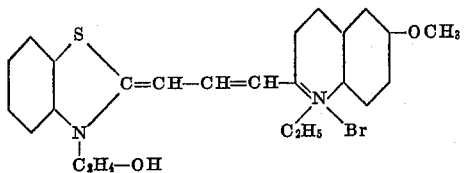

with an interpolymer of maleic anhydride and vinyl acetate.

7. A process for preparing a resin-dye comprising reacting 2-p-dimethylaminostyrylbenzothiazole β-hydroxyethobromide represented by the following formula:

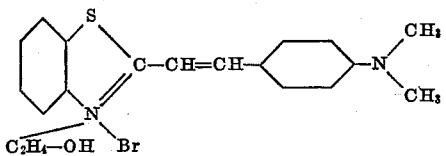

with an interpolymer of maleic anhydride and vinyl acetate.

8. A process for preparing a resin dye comprising reacting 3-ethyl-1'-β-hydroxyethyl-2',5'-dimethyloxa - 3' - pyrrolocarbocyanineiodide represented by the following formula:

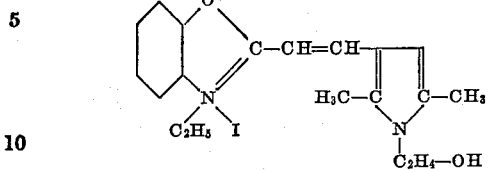

with polyacrylyl chloride.

ROBERT H. SPRAGUE.
LESLIE G. S. BROOKER.
SAMUEL G. DENT, Jr.

References Cited in the file of this patent

UNITED STATES PATENTS

| Number | Name | Date |
| --- | --- | --- |
| 2,178,612 | Schneider | Nov. 7, 1939 |
| 2,186,731 | Schneider | Jan. 9, 1940 |
| 2,186,733 | Schneider | Jan. 9, 1940 |
| 2,307,399 | Frohlich | Jan. 5, 1943 |

FOREIGN PATENTS

| Number | Country | Date |
| --- | --- | --- |
| 532,098 | Great Britain | of 1941 |